(12) United States Patent
Hirata et al.

(10) Patent No.: US 12,422,628 B2
(45) Date of Patent: Sep. 23, 2025

(54) OPTICAL WAVEGUIDE ELEMENT, AND OPTICAL MODULATION DEVICE AND OPTICAL TRANSMISSION APPARATUS USING SAME

(71) Applicant: SUMITOMO OSAKA CEMENT CO., LTD., Tokyo (JP)

(72) Inventors: Shotaro Hirata, Tokyo (JP); Shingo Takano, Tokyo (JP); Yu Kataoka, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 284 days.

(21) Appl. No.: 18/029,393

(22) PCT Filed: Sep. 29, 2021

(86) PCT No.: PCT/JP2021/035807
§ 371 (c)(1),
(2) Date: Mar. 30, 2023

(87) PCT Pub. No.: WO2022/071377
PCT Pub. Date: Apr. 7, 2022

(65) Prior Publication Data
US 2023/0314732 A1    Oct. 5, 2023

(30) Foreign Application Priority Data
Sep. 30, 2020  (JP) .................................. 2020-165003

(51) Int. Cl.
*G02B 6/122* (2006.01)
*G02B 6/42* (2006.01)
*G02F 1/01* (2006.01)

(52) U.S. Cl.
CPC ......... *G02B 6/4212* (2013.01); *G02B 6/1228* (2013.01); *G02B 6/4246* (2013.01); *G02F 1/0115* (2013.01)

(58) Field of Classification Search
CPC ................................................ G02B 6/1228
See application file for complete search history.

(56) References Cited

U.S. PATENT DOCUMENTS

| 6,571,039 | B1 | 5/2003 | Al-Hemyari |
| 9,547,129 | B1 | 1/2017 | Kato |
| (Continued) | | | |

FOREIGN PATENT DOCUMENTS

| CN | 110632702 A | 12/2019 |
| CN | 111175999 A | 5/2020 |
| (Continued) | | |

OTHER PUBLICATIONS

JP-2004133446-A English translation (Year: 2004).*
JP-3923355-B2 English translation (Year: 2007).*

*Primary Examiner* — Charlie Y Peng
(74) *Attorney, Agent, or Firm* — IpHorgan Ltd.

(57) ABSTRACT

An optical waveguide element that suppresses insertion loss related to coupling to an optical fiber or the like while miniaturizing the optical waveguide element is provided. There is provided an optical waveguide element including: a rib optical waveguide (10) that is made of a material (1) having an electro-optic effect; and the reinforcing substrate (2) that supports the optical waveguide, in which one end of the optical waveguide forms a tapered portion (11) of which a width narrows toward an end surface of the reinforcing substrate, a structure (3) made of a material having a higher refractive index than a material constituting the reinforcing substrate is provided so as to cover the tapered portion, and a coating layer (4) made of a material having a lower (Continued)

refractive index than the material constituting the structure is disposed so as to cover the structure.

7 Claims, 12 Drawing Sheets

(56) References Cited

U.S. PATENT DOCUMENTS

| | | | |
|---|---|---|---|
| 2005/0207702 A1* | 9/2005 | Yamazaki | G02B 6/1228 385/39 |
| 2007/0122072 A1 | 5/2007 | Kondou | |
| 2013/0170793 A1* | 7/2013 | Ushida | G02B 6/1228 385/43 |
| 2015/0219844 A1 | 8/2015 | Mizutani | |
| 2017/0045686 A1 | 2/2017 | Lee | |
| 2017/0184792 A1 | 6/2017 | Courjal | |
| 2019/0265415 A1* | 8/2019 | Psaila | G02B 6/29331 |
| 2019/0384003 A1 | 12/2019 | Painchaud | |
| 2020/0033692 A1 | 1/2020 | Katou et al. | |
| 2021/0302764 A1* | 9/2021 | Takano | G02F 1/035 |
| 2022/0100048 A1 | 3/2022 | Zou et al. | |
| 2022/0268997 A1* | 8/2022 | Debregeas | G02B 6/14 |

FOREIGN PATENT DOCUMENTS

| | | | | |
|---|---|---|---|---|
| CN | 111458793 A | | 7/2020 | |
| JP | H7-1995-74396 A | | 3/1995 | |
| JP | 2004133446 A | * | 4/2004 | G02B 6/1228 |
| JP | 2005-241711 A | | 9/2005 | |
| JP | 2006284961 A | | 10/2006 | |
| JP | 3923355 B2 | * | 5/2007 | |
| JP | 2010230741 | | 10/2010 | |
| JP | 6369036 B2 | | 8/2015 | |
| JP | 2015-206969 A | | 11/2015 | |
| JP | 201671256 A | | 5/2016 | |
| JP | 2020091378 A | | 6/2020 | |
| WO | 2012042708 A1 | | 4/2012 | |
| WO | 2013146818 A1 | | 10/2013 | |
| WO | WO-2019141776 A1 | * | 7/2019 | |
| WO | WO-2022210853 A1 | * | 10/2022 | G02B 6/122 |

* cited by examiner

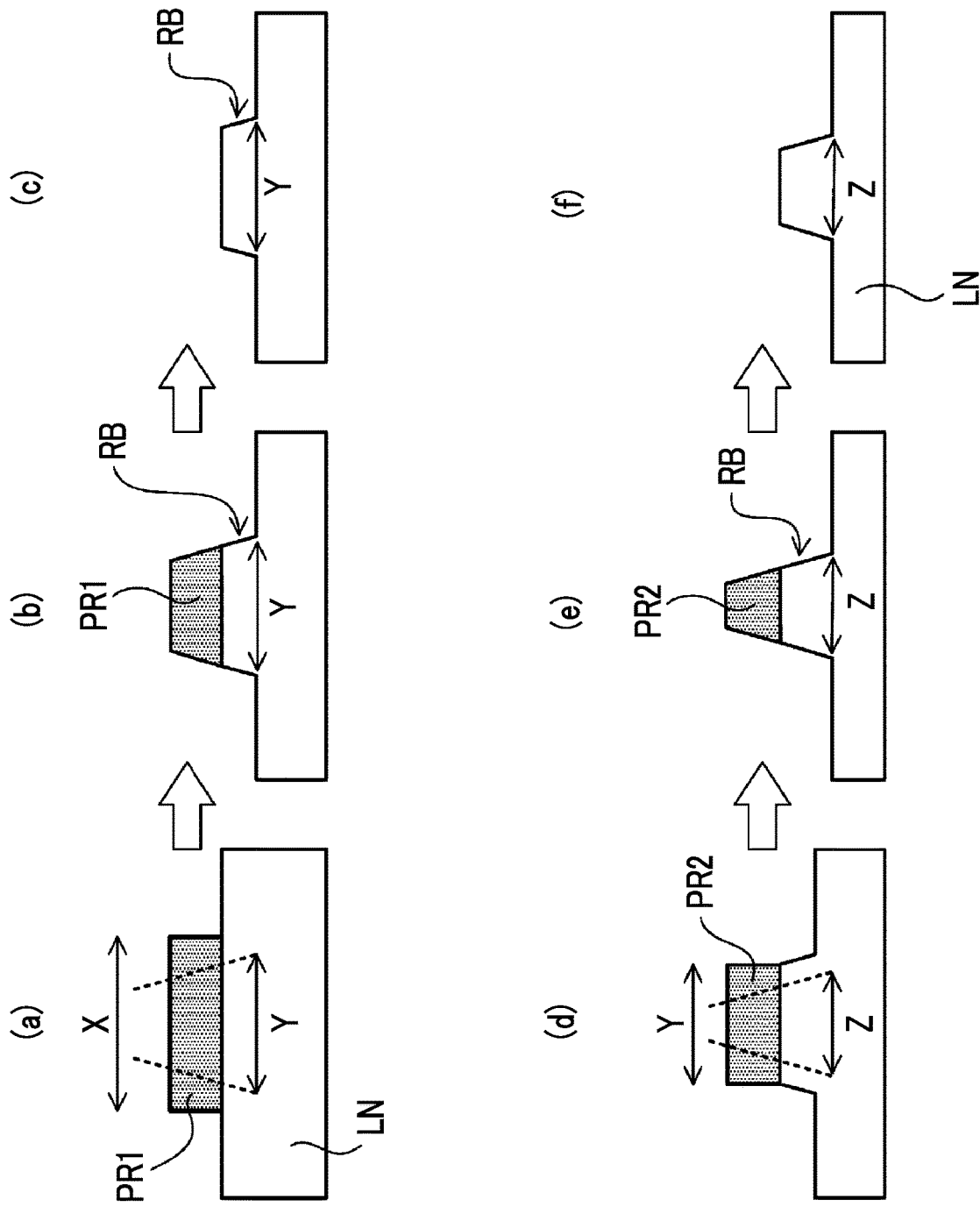

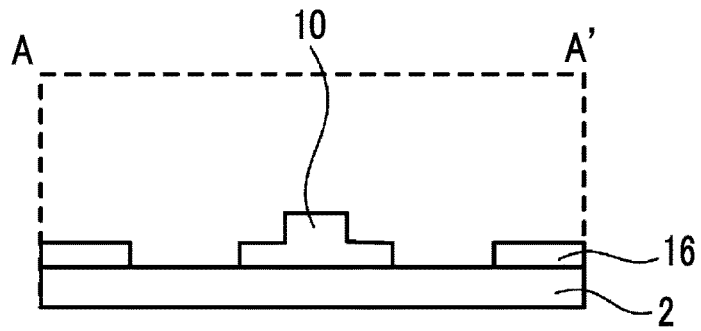
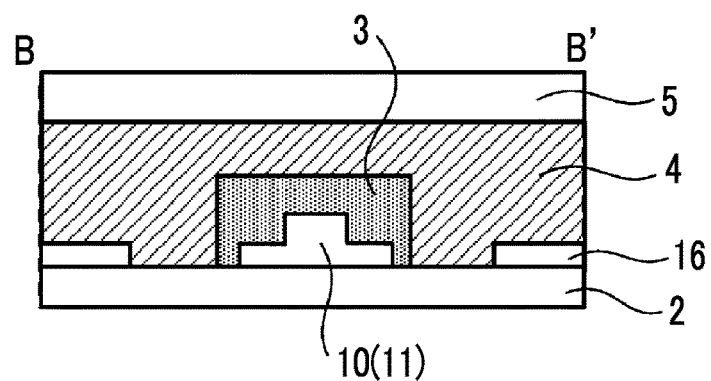
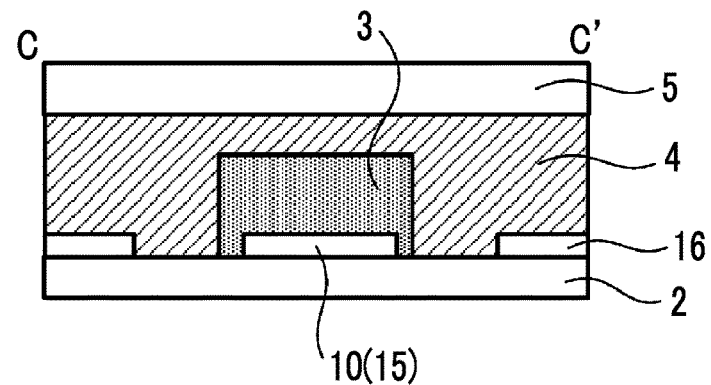
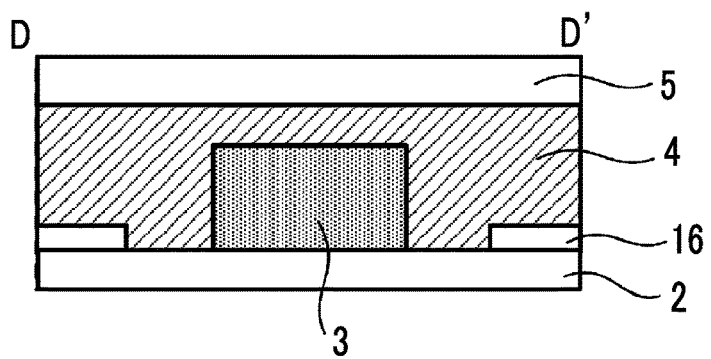

OPTICAL WAVEGUIDE ELEMENT, AND OPTICAL MODULATION DEVICE AND OPTICAL TRANSMISSION APPARATUS USING SAME

CROSS REFERENCE TO RELATED APPLICATIONS

This application is a national stage completion application of PCT Application No. PCT/JP2021/035807, filed Sep. 29, 2021, and claims priority from Japanese Patent Application No. 2020-165003 filed Sep. 30, 2020. Each of these applications is incorporated by reference herein in its entirety.

TECHNICAL FIELD

The present invention relates to an optical waveguide element, and an optical modulation device and an optical transmission apparatus using the same, and more particularly, to an optical waveguide element including a rib optical waveguide that is made of a material having an electro-optic effect and the reinforcing substrate that supports the optical waveguide.

BACKGROUND ART

In recent years, with the increase in the amount of information in the field of information communication, not only optical communication for long-distance transmission but also high-speed and large-capacity optical communication used between cities or between data centers is desired. Moreover, since there is also a limitation due to a space of a base station, there is an increasing need for speeding up and miniaturization of an optical modulator.

In particular, for miniaturization of the optical modulator, a light confinement effect of an optical waveguide is strengthened by reducing the bending radius of the optical waveguide, for example, by bending directions of a light wave to be input to an optical waveguide element and a light wave to be output by 90 degrees or 180 degrees, and the like, so that an optical modulator suitable for miniaturization can be manufactured. In order to strengthen such light confinement, it is effective to thin the optical waveguide, for example, by setting a mode field diameter (MFD) of a propagating light wave to 3 μm or lower.

Although LiNbO$_3$ (hereinafter referred to as LN) having an electro-optic effect is used as an optical modulator for long distances because of its less distortion and less optical loss when converting an electrical signal into an optical signal, miniaturization has been difficult because the MFD of the conventional optical waveguide is about 10 μm and the bending radius is as large as several tens of millimeters. However, in recent years, LN thinning has become possible because of improvements in polishing technology and bonding technology, and research and development of LN optical waveguide elements with an MFD of about 1 μm are underway.

Meanwhile, the MFD of an optical fiber is about 10 μm, and in an optical waveguide element including a fine optical waveguide having an MFD of lower than 3 μm, in a case where the optical fiber is directly joined to an element end surface, a large insertion loss occurs when light is input from the element end surface. In order to solve this problem, studies are underway to, for the light wave to be input, narrow down the light wave having a spot size with an MFD of 3 μm or higher to an MFD of 3 μm or lower and to, for the light wave to be output, provide a spot size converter (SSC), which inversely expands the light wave spot size, in the chip.

In a general SSC, as shown in Patent Literature Nos. 1 to 3, a tapered optical waveguide of which a width or a thickness expands two-dimensionally or three-dimensionally toward an end portion of the optical waveguide is used. Although the advantage of this method is that the design is simple, there is a limitation on available designs because widening the optical waveguide induces multimode, so that this method is not suitable for optical modulators.

CITATION LIST

Patent Literature

[Patent Literature No. 1] Pamphlet of International Publication No. WO2012/042708
[Patent Literature No. 2] Pamphlet of International Publication No. WO2013/146818
[Patent Literature No. 3] Japanese Patent No. 6369036

SUMMARY OF INVENTION

Technical Problem

An object to be achieved by the present invention is to solve the above-mentioned problems and to provide an optical waveguide element that suppresses the insertion loss related to coupling to an optical fiber or the like while miniaturizing the optical waveguide element. Another object is to further provide an optical modulation device and an optical transmission apparatus using the optical waveguide element.

Solution to Problem

In order to achieve the above objects, an optical waveguide element, and an optical modulation device and an optical transmission apparatus using the same of the present invention have the following technical features.

(1) There is provided an optical waveguide element including: a rib optical waveguide that is made of a material having an electro-optic effect; and the reinforcing substrate that supports the optical waveguide, in which one end of the optical waveguide forms a tapered portion of which a width narrows toward an end surface of the reinforcing substrate, a structure made of a material having a higher refractive index than a material constituting the reinforcing substrate is provided so as to cover the tapered portion, and a coating layer made of a material having a lower refractive index than the material constituting the structure is disposed so as to cover the structure.

(2) In the optical waveguide element according to (1), the tapered portion includes optical waveguides having a shape of being stacked in multiple stages, and a width of the optical waveguide disposed on an upper side is narrower than a width of the optical waveguide disposed on a lower side.

(3) In the optical waveguide element according to (1) or (2), the coating layer is made of an adhesive, and the coating layer functions as an adhesive layer for joining an upper reinforcing substrate disposed on an upper side of the structure to the reinforcing substrate side on which the optical waveguide and the structure are formed.

(4) In the optical waveguide element according to any one of (1) to (3), a thickness of the reinforcing substrate near the end surface of the reinforcing substrate is thinner than a thickness of the reinforcing substrate on a lower side of the tapered portion.

(5) In the optical waveguide element according to any one of (1) to (4), a mode field diameter of a light wave propagating through the optical waveguide is lower than 3 μm, and a mode field diameter of an optical fiber that is connected to the optical waveguide element and through which a light wave is input to or output from the optical waveguide is 3 μm or higher.

(6) There is provided an optical modulation device including: the optical waveguide element according to any one of (1) to (5), the optical waveguide element being accommodated in a case and provided with an optical fiber through which a light wave is input to or output from the optical waveguide.

(7) In the optical modulation device according to (6), the optical waveguide element includes a modulation electrode for modulating a light wave propagating through the optical waveguide, and an electronic circuit that amplifies a modulation signal input to the modulation electrode of the optical waveguide element is provided inside the case.

(8) There is provided an optical transmission apparatus including: the optical modulation device according to (6) or (7); and an electronic circuit that outputs a modulation signal for causing the optical modulation device to perform a modulation operation.

Advantageous Effects of Invention

The present invention provides an optical waveguide element including: a rib optical waveguide that is made of a material having an electro-optic effect; and the reinforcing substrate that supports the optical waveguide, in which one end of the optical waveguide forms a tapered portion of which a width narrows toward an end surface of the reinforcing substrate, a structure made of a material having a higher refractive index than a material constituting the reinforcing substrate is provided so as to cover the tapered portion, and a coating layer made of a material having a lower refractive index than the material constituting the structure is disposed so as to cover the structure. Therefore, it is possible to reduce or expand the MFD of the light wave while suppressing the occurrence of multimode light, so that it is possible to provide an optical waveguide element that suppresses insertion loss related to coupling to an optical fiber or the like and that is suitable for miniaturization.

BRIEF DESCRIPTION OF DRAWINGS

FIG. 5 is a diagram illustrating a change in rib shape through a two-stage etching process.

FIGS. 11A to 11D are cross-sectional views taken along respective dotted lines of FIG. 10.

DESCRIPTION OF EMBODIMENTS

Figure 1:
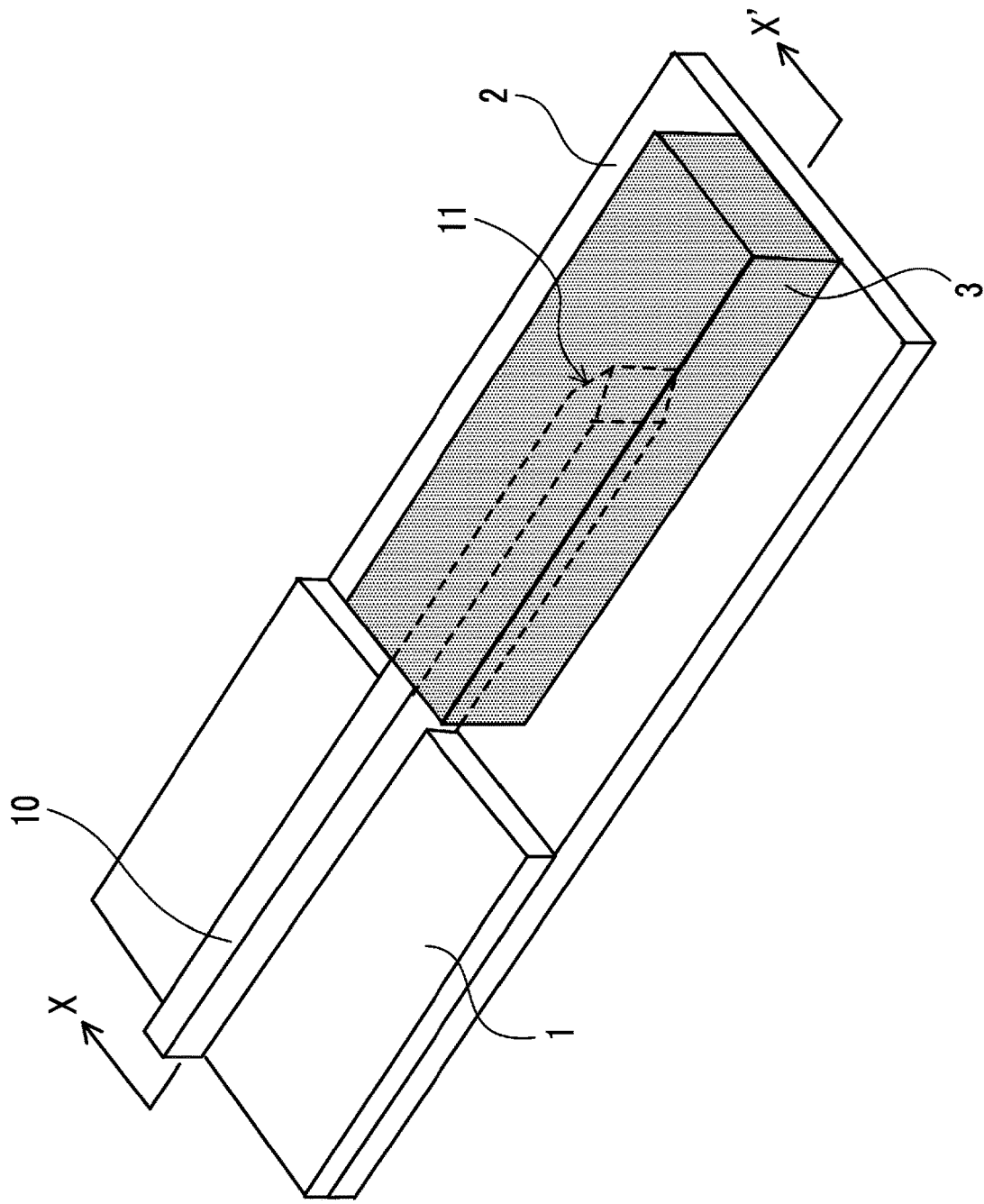
FIG. 1 is a perspective view showing an example of an optical waveguide element of the present invention.

Hereinafter, an optical waveguide element of the present invention will be described in detail using preferred examples.

In the following description, the structure of an end portion of an optical waveguide will be described mainly on an output portion, but it is needless to say that an input portion can also be configured in the same manner.

As shown in FIGS. 1 to 4D, the optical waveguide element of the present invention is an optical waveguide element including: a rib optical waveguide 10 that is made of a material (1) having an electro-optic effect; and the reinforcing substrate 2 that supports the optical waveguide, in which one end of the optical waveguide forms a tapered portion 11 of which a width narrows toward an end surface of the reinforcing substrate, a structure 3 made of a material having a higher refractive index than a material constituting the reinforcing substrate is provided so as to cover the tapered portion, and a coating layer 4 made of a material having a lower refractive index than the material constituting the structure is disposed so as to cover the structure.

As the material constituting the optical waveguide used in the optical waveguide element of the present invention, a substrate of a ferroelectric material having an electro-optic effect, specifically, lithium niobate (LN), lithium tantalate (LT), lead lanthanum zirconate titanate (PLZT), or the like, an epitaxial film using these materials, or the like can be used. In addition, various materials, such as a semiconductor material or an organic material, can also be used as a substrate of the optical waveguide element.

The thickness of the optical waveguide 10 used in the present invention is extremely thin on the order of several μm, and there is a method of mechanically polishing and thinning a crystal substrate, such as LN, or a method of using an epitaxial film, such as LN. In a case of the epitaxial film, for example, an epitaxial film is formed by a sputtering method, a CVD method, a sol-gel method, or the like in accordance with the crystal orientation of a single crystal substrate, such as a $SiO_2$ substrate, a sapphire single crystal substrate, or a silicon single crystal substrate.

Since the thickness of a waveguide layer is thin, the reinforcing substrate 2 is disposed on the back surface side of the optical waveguide 10 in order to enhance the mechanical strength of the optical waveguide element. The reinforcing substrate 2 may be made of a material having a lower refractive index than the waveguide layer, such as a $SiO_2$ substrate. It is also possible to directly join a layer 1 constituting the optical waveguide 10 onto the reinforcing substrate 2, or use the reinforcing substrate 2 as a base for crystal growth to provide a layer of an epitaxial film constituting the optical waveguide.

As a method for forming a rib-type protrusion constituting the optical waveguide, a method of forming the protrusion by dry or wet etching a layer (for example, an LN layer) forming the optical waveguide can be used. In addition, in order to increase the refractive index of the rib portion, a method of thermally diffusing a high refractive index material, such as Ti, to the position of the rib portion can also be used.

Figure 3:
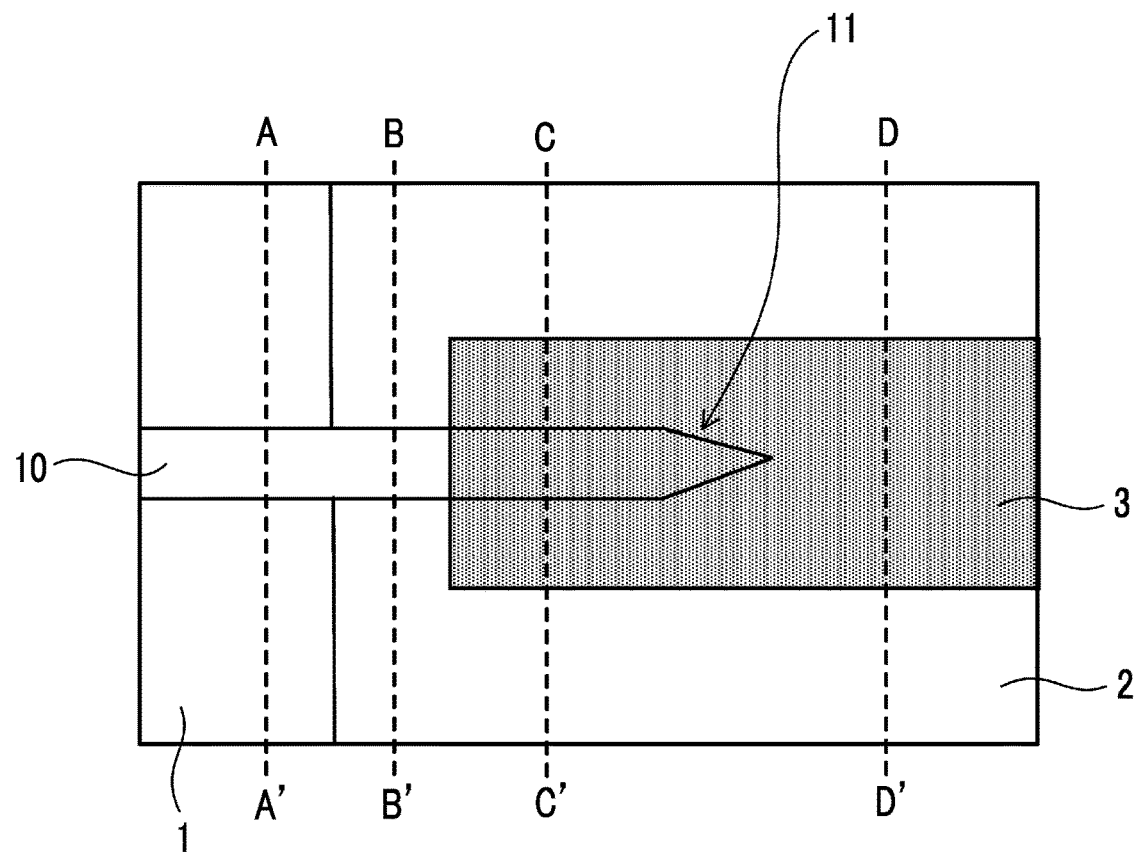
FIG. 3 is a plan view of the optical waveguide element of FIG. 1.
Figure 4A:
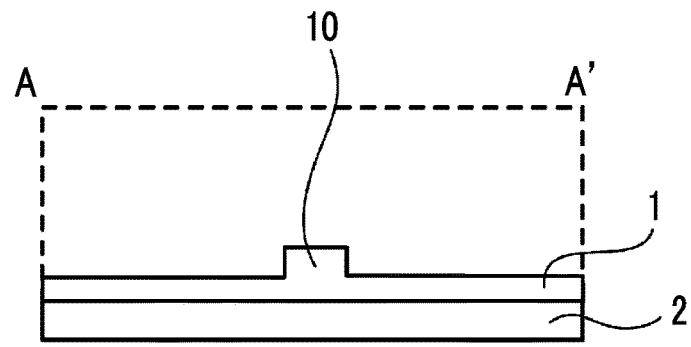
FIGS. 4A to 4D are cross-sectional views taken along respective dotted lines of FIG. 3.
Figure 4B:
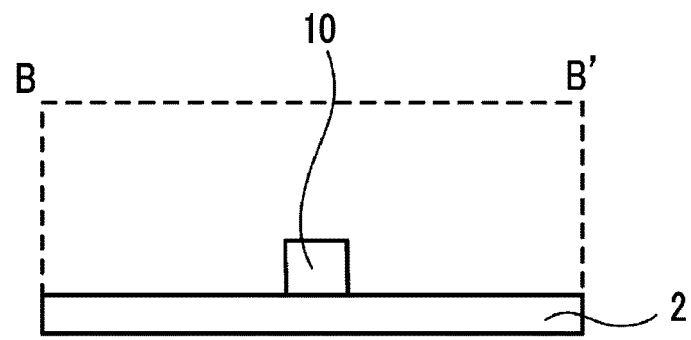
Figure 4C:
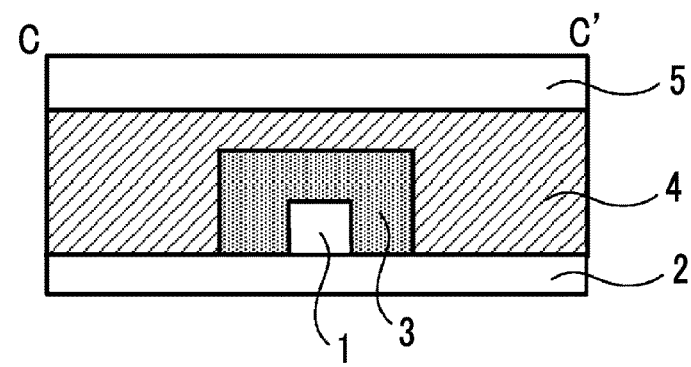
Figure 4D:
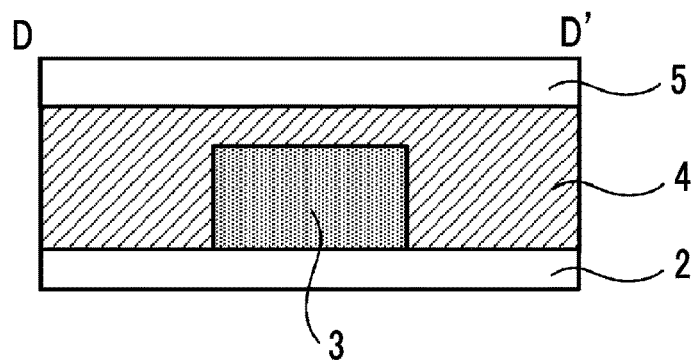

The feature of the optical waveguide element of the present invention employs, as shown in FIG. 1 or 3, the tapered portion 11 of which the width narrows toward the end surface of the reinforcing substrate 2, a so-called "reverse tapered shape" as one end (the input portion or the output portion of the light wave) of the rib optical waveguide 10. This shape is completely different from the tapered shape of the conventional Patent Literature Nos. 1 to 3 in which the width becomes wider or the thickness becomes thicker toward the end portion. Although FIG. 1 or 3 shows a reverse tapered shape in which the width of the optical waveguide changes as an example, the present invention is not limited to such a shape, and for example, a shape in which the thickness gradually decreases, a shape in which the width narrows and the thickness also decreases, or the like can also be employed within a range in which the refractive index difference between a core portion and a clad portion can be secured when the light wave propagates in a single mode.

In addition, the structure 3 made of a material having a higher refractive index than the material constituting the reinforcing substrate 2 is provided so as to cover the tapered portion of which the width is narrowed down. The refractive index of this structure is lower than the refractive index of the material constituting the optical waveguide 10. As the material of the structure 3, it is possible to use an inorganic material, such as glass, or a resin material with an increased refractive index. Considering the durability of the SSC, the structure 3 may be made of an inorganic material.

In a case where the structure 3 is made of a resin material, such as an adhesive or a photoresist (permanent resist), air bubbles are likely to enter the vicinity of the optical waveguide 10 when the resin is applied. Therefore, it is more preferable to form a film of an inorganic material through a sputtering method or the like.

Figure 2:
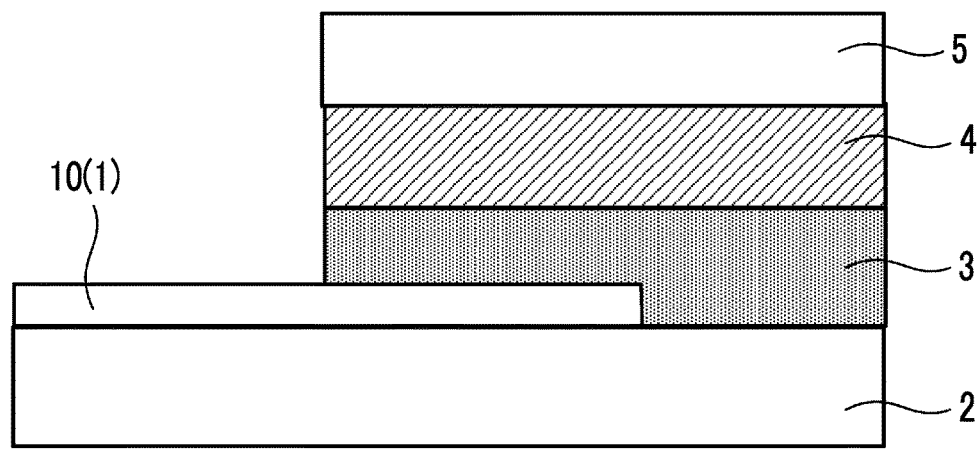
FIG. 2 is a cross-sectional view of the optical waveguide element of FIG. 1 taken along a line X-X'.

Further, the coating layer 4 made of a material having a lower refractive index than the material constituting the structure 3 is disposed so as to cover the structure. A resin layer, such as an adhesive, can be used as the coating layer, but an air layer may also be used. In addition, as shown in FIG. 2, the coating layer 4 is made of an adhesive, and it is also possible to make the coating layer 4 function as an adhesive layer for joining an upper reinforcing substrate 5 disposed on the upper side of the structure 3 to the reinforcing substrate (2) side on which the optical waveguide 10 and the structure 3 are formed. This upper reinforcing substrate 5 enhances the mechanical strength of the end surface of the optical waveguide element and also serves as a support means when an optical fiber or an optical block is directly joined to the end surface. Such a support means facilitates the optical axis alignment of the optical fiber and the optical waveguide, and can reduce the connection loss even in a case of connection between different MFDS.

The respective cross-sections taken along dotted lines A-A' to D-D' of FIG. 3 are shown in FIGS. 4A to 4D. With these configurations, from the rib optical waveguide 10 of FIG. 4A to the optical waveguide having the structure 3 of FIG. 4D as a core portion and the reinforcing substrate 2 and the coating layer 4 as a clad, the optical waveguide is gradually switched from FIGS. 4A to 4D to realize spot size conversion of the propagating light wave. For example, a light wave propagating through the optical waveguide 10 and having an MFD of 1 μm can be expanded to a light wave having an MFD of about 3 μm at the stage of FIG. 4D while maintaining the single mode.

Here, in producing the optical waveguide 10 having the reverse tapered shape, it is necessary to thin an etching mask itself in order to prevent the etching mask from being peeled off at the portion having a narrow width. However, in a case where the etching mask is thinned, it is difficult to produce the rib optical waveguide through single etching process. For this reason, as shown in FIG. 5, it is conceivable to divide the etching process into two stages, that is, the etching process of (a) to (c) of FIG. 5 and the etching process of (d) to (f) of FIG. 5. However, although the depth (height) of the rib RB can be obtained, the width Y of the optical waveguide changes to the width Z and becomes narrower because the LN is etched obliquely. Symbols PR1 and PR2 in FIG. 5 indicate photoresists, and dotted lines in (a) and (d) of FIG. 5 indicate boundaries removed by the resist pattern.

Figure 6:
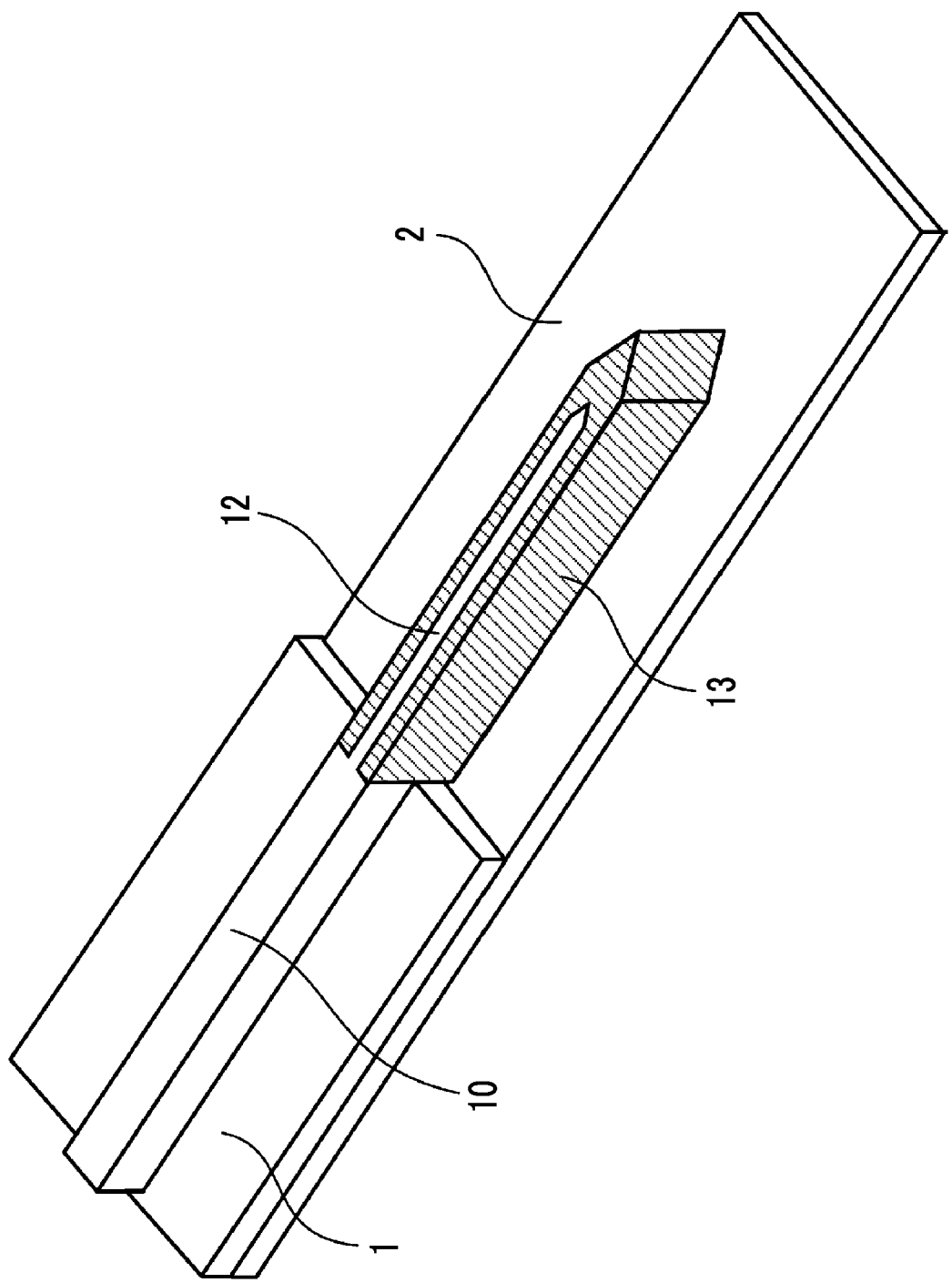
FIG. 6 is a diagram illustrating a shape of an end portion of an optical waveguide subjected to the two-stage etching process of FIG. 5.

FIG. 6 shows a case where a resist pattern is disposed on the pattern of the optical waveguide 10 produced once and the LN around the optical waveguide 10 is further removed to make the depth of the optical waveguide 10 deeper, as shown in FIG. 5. In this case, since the portion indicated by diagonal lines is further cut away, the width of the optical waveguide 12 becomes narrower. Since the width of the reverse tapered shape also sharply narrows, the propagation loss increases.

Figure 7:
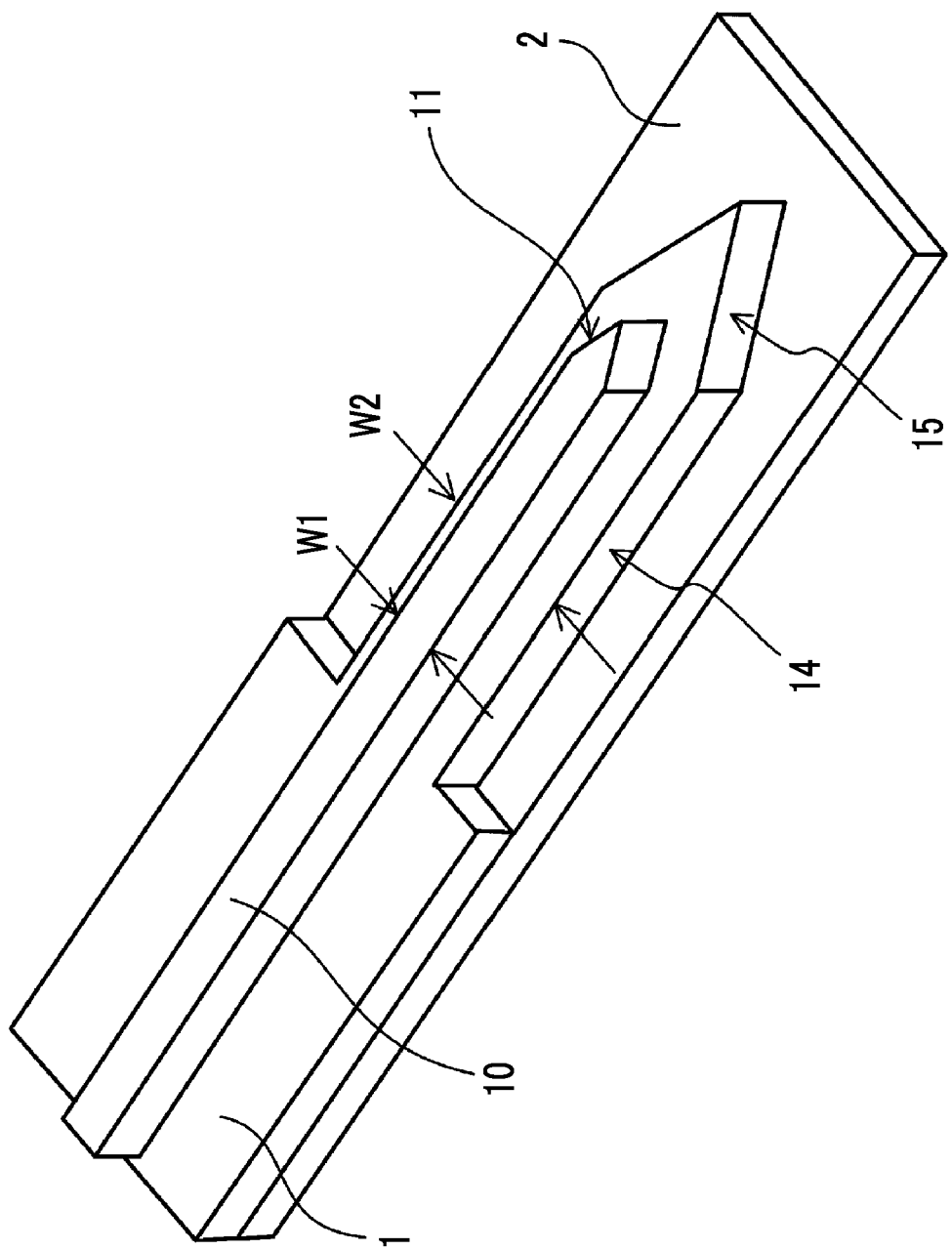
FIG. 7 is a perspective view showing another shape of the optical waveguide used in the optical waveguide element of the present invention.

In order to maintain the reverse tapered shape as designed, in the optical waveguide element of the present invention, as shown in FIG. 7, tapered portions (11, 15) include optical waveguides (10, 14) having a shape of being stacked in multiple stages, and the width W1 of the optical waveguide 10 disposed on the upper side is narrower than the width W2 of the optical waveguide 14 disposed on the lower side.

In forming the optical waveguide as shown in FIG. 7, the first etching is performed using a resist pattern that matches the shape of the optical waveguide 10, and the second etching is performed using a resist pattern that matches the shape of the optical waveguide 14. In FIG. 7 (or FIG. 1), the vicinity of the tapered portion is etched until the reinforcing substrate 2 is exposed, but an extremely thin LN portion may remain.

Figure 8:
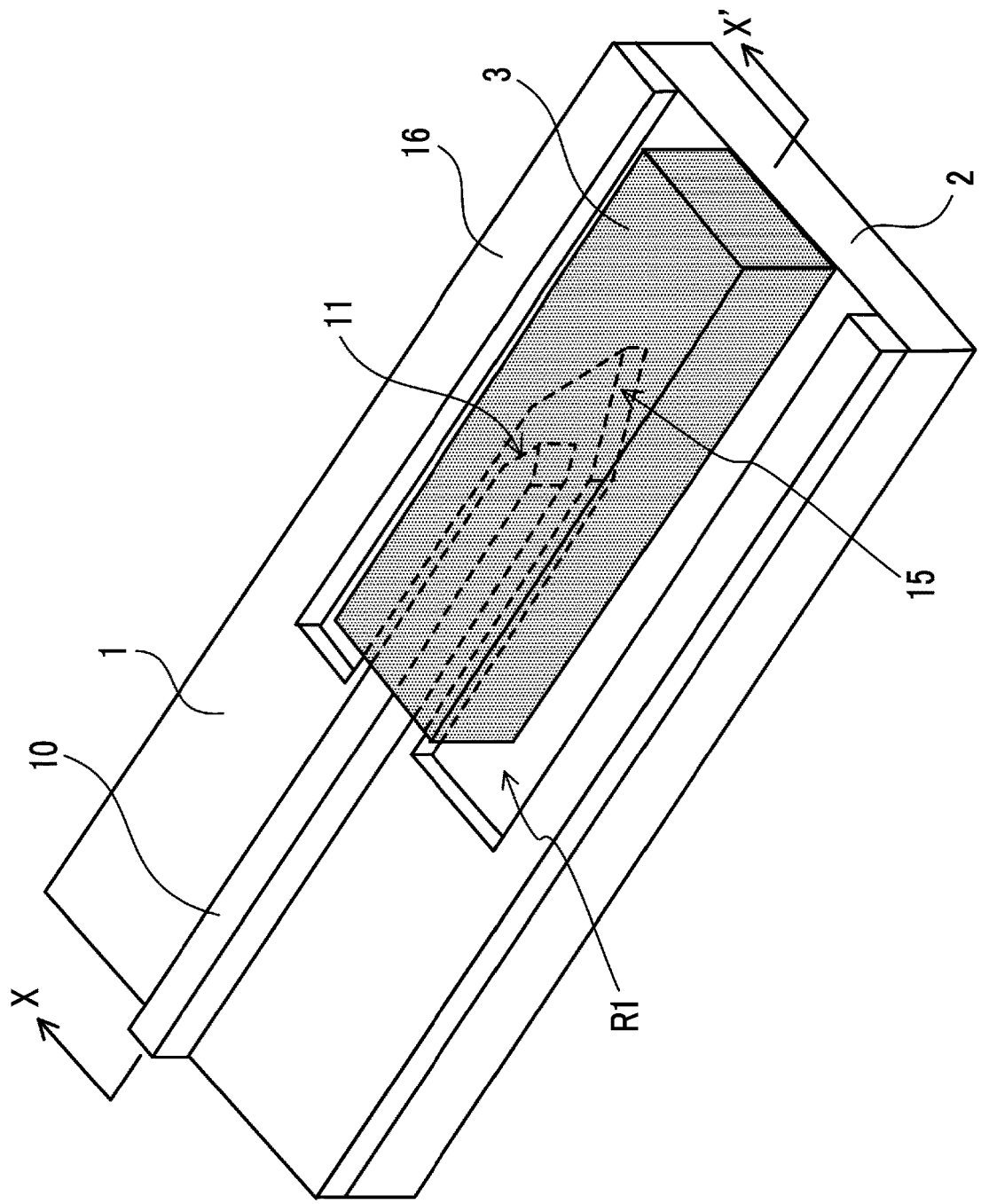
FIG. 8 is a perspective view showing an optical waveguide element including an optical waveguide having the shape shown in FIG. 7.

FIGS. 8 to 11D show an SSC employing the shape of the tapered portion shown in FIG. 7. As shown in FIG. 8, LN (1), which is the material constituting the optical waveguide, may be left without particularly removing a portion 16 apart from the optical waveguide. The tapered portion of FIG. 8 is stacked in two stages to constitute the tapered portions (11, 15), but the present invention is not limited to the two stages, and three or more stages may be used.

Figure 9:
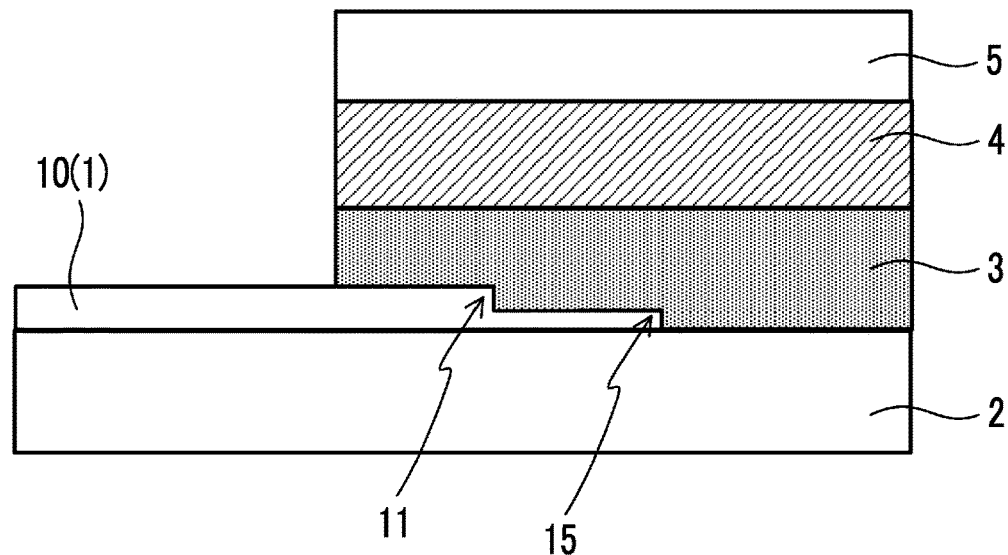
FIG. 9 is a cross-sectional view of the optical waveguide element of FIG. 8 taken along a line X-X'.

The structure 3 is disposed so as to cover the tapered portion of the optical waveguide. The structure 3 is similar to that described above. Further, as shown in FIG. 9, the coating layer 4 and the upper reinforcing substrate 5 are disposed in the same manner as in FIG. 2. Of course, it is needless to say that it is also possible to replace the coating layer 4 with an air layer.

Figure 10:
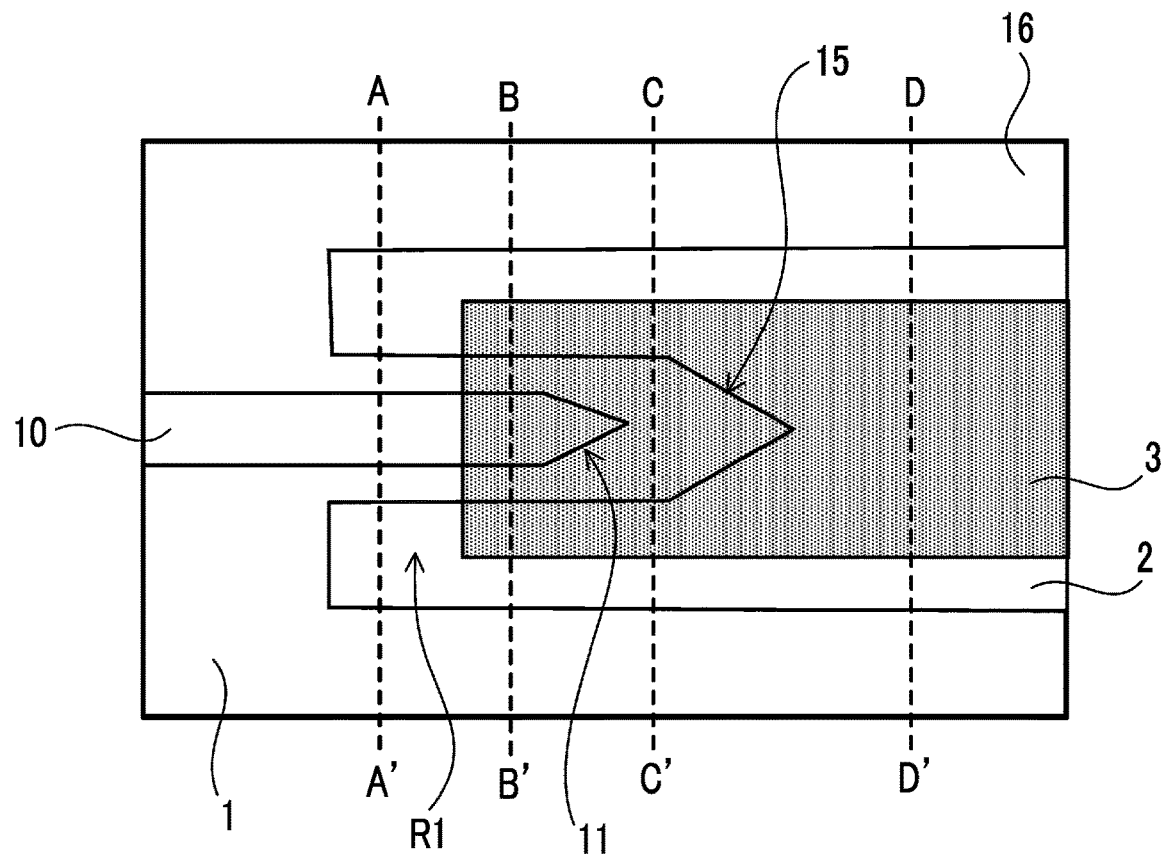
FIG. 10 is a plan view of the optical waveguide element of FIG. 8.

FIGS. 11A to 11D are cross-sectional views taken along dotted lines A-A' to D-D' in FIG. 10. The MFD of the light wave propagating through the optical waveguide 10 of FIG. 11A gradually changes from FIGS. 11A to 11D, and finally, the MED of the light wave is gradually expanded to the optical waveguide including the core portion 3 and the clad portion (2 and 4) as shown in FIG. 11D.

The propagation loss of the SSC having the shape of FIG. 1 and the SSC having the shape of FIG. 8 was compared by simulation. As for the refractive index of each member, it is assumed that the optical waveguide 10 has a refractive index of 2.138, the reinforcing substrate 2 has a refractive index of 1.494, the structure 3 has a refractive index of 1.575, and the coating layer 4 has a refractive index of 1.542. It is assumed that the thickness of the layer 1 of the material constituting the optical waveguide of FIG. 1 is 0.2 µm, the thickness of the optical waveguide 10 protruding from the front surface of the layer 1 is 0.6 µm, and the width of the optical waveguide 10 is 1.3 µm. It is assumed that the width of the optical waveguide constituting the tapered portion 11 in FIG. 8 is 1.3 µm and the width of the optical waveguide constituting the tapered portion 15 is 3.0 µm.

As a result of simulation, it was confirmed that the tapered portion formed in two stages as shown in FIG. 8 improved the propagation loss from 0.41 to 0.05 (Loss/dB) as compared with the tapered portion formed in one stage. In addition, considering the coupling loss of the optical fiber, the propagation loss of the light wave propagating from the optical waveguide 10 through the SSC portion to the optical fiber was improved from 0.73 to 0.32 (Loss/dB).

Figure 12:
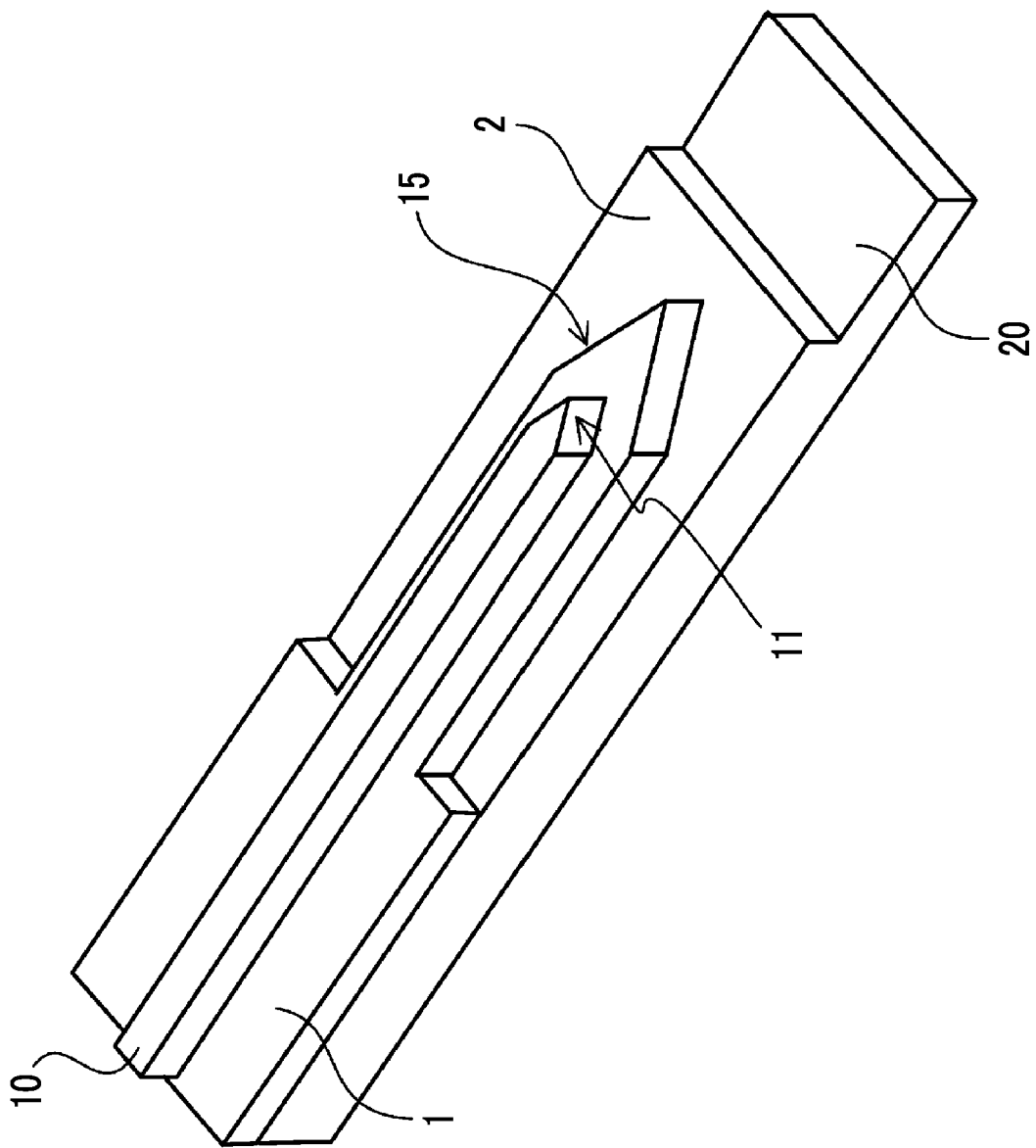
FIG. 12 is a perspective view illustrating an example in which a thickness of a part of the reinforcing substrate of the optical waveguide element of the present invention is reduced.
Figure 13A:
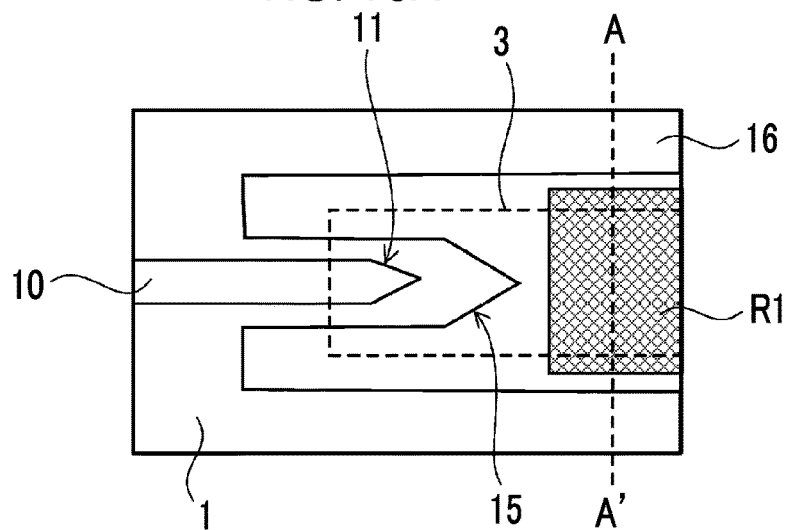
FIGS. 13A to 13C are diagrams illustrating a portion where the thickness of the reinforcing substrate is reduced.
Figure 13B:
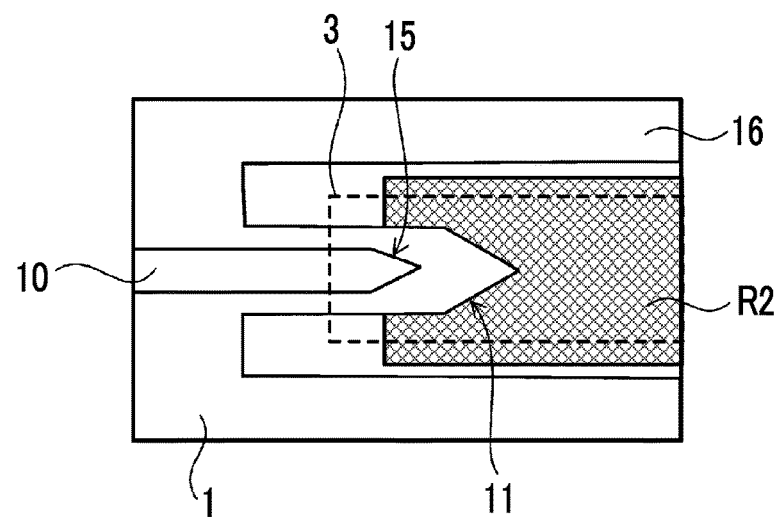
Figure 13C:
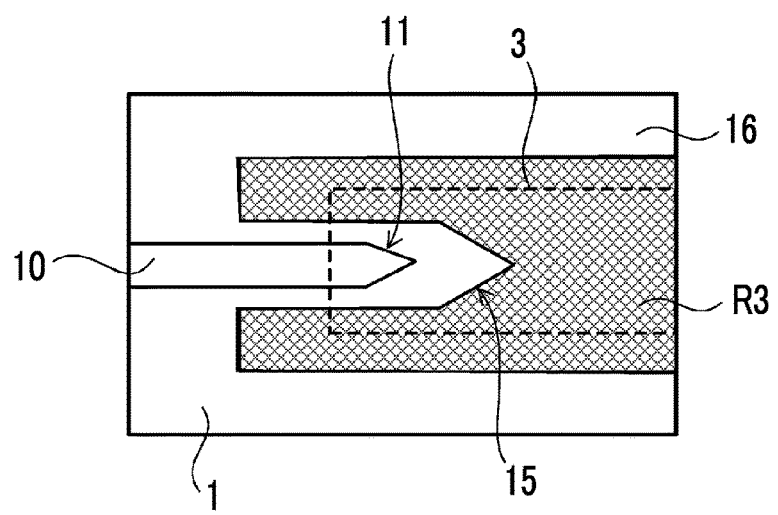

Further, as shown in FIGS. 12 to 13C, a configuration can also be employed in which the thickness of the reinforcing substrate 20 near the end surface of the reinforcing substrate (on the lower right side in FIG. 12) is made equal to or thinner than the thickness of the reinforcing substrate 2 provided on the lower side of the tapered portion (15). FIGS. 13A to 13C show a thinned portion of the reinforcing substrate 20 (a region cut deeper in the reinforcing substrate 2) as shaded portions R1 to R3. The present invention is not limited to a case of thinning the reinforcing substrate 2 only near the end surface of the optical waveguide element of FIG. 13A, and a configuration can also be employed in which the reinforcing substrate 2 is thinned in conformity with the shape of the tapered portion 15 as shown in FIG. 13C.

Figure 14:
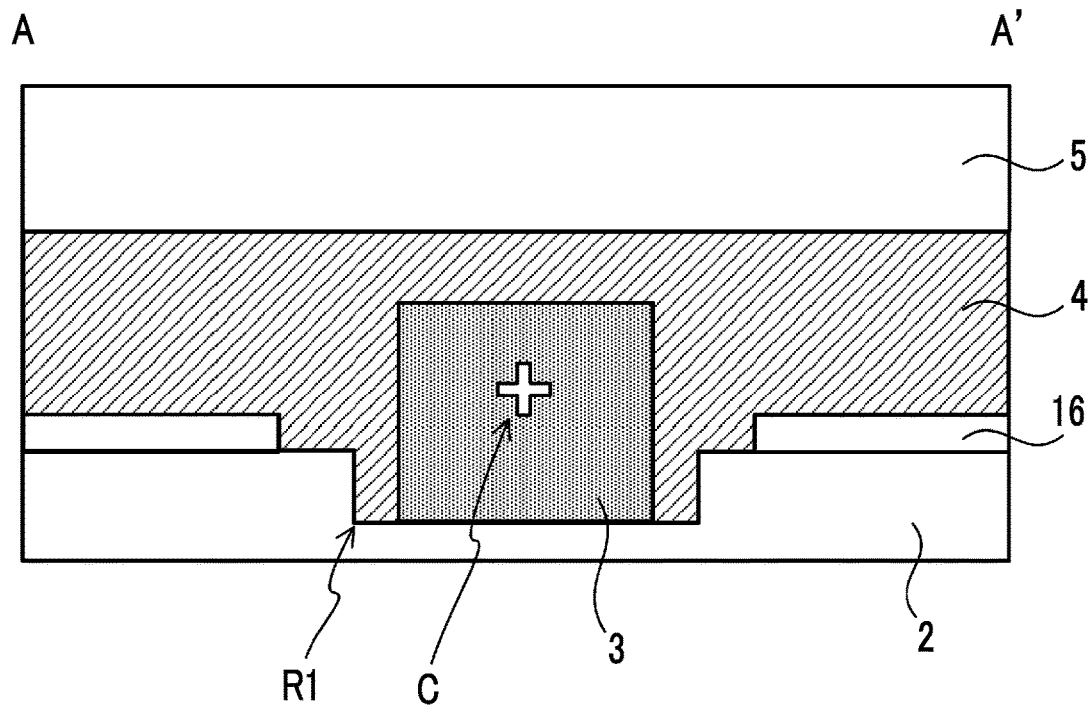
FIG. 14 is a cross-sectional view taken along a dotted line A-A' in FIG. 13A.

FIG. 14 is a cross-sectional view taken along a dotted line A-A' of FIG. 13A, and the white cross shown in FIG. 14 is displayed by being superimposed on the tip position of the tapered portion 11 of the optical waveguide. In this manner, by providing a portion in which the reinforcing substrate 2 is made thinner, it is also possible to adjust the position of the tapered portion 11, which is the tip of the optical waveguide 10, to the central position of the optical waveguide having the structure 3 as the core portion, and it is possible to reduce the propagation loss.

In the optical waveguide element of the present invention, the MFD of the light wave propagating through the optical waveguide in the element is lower than 3 µm (for example, about 1 µm), and the mode field diameter of the optical fiber that is connected to the optical waveguide element and through which the light wave is input to or output from the optical waveguide in the element is 3 µm or higher (for example, 10 µm). As a result, the radius of curvature of the optical waveguide in the optical waveguide element can be reduced while using a general optical fiber, which contributes to miniaturization of the optical waveguide element.

Figure 15:
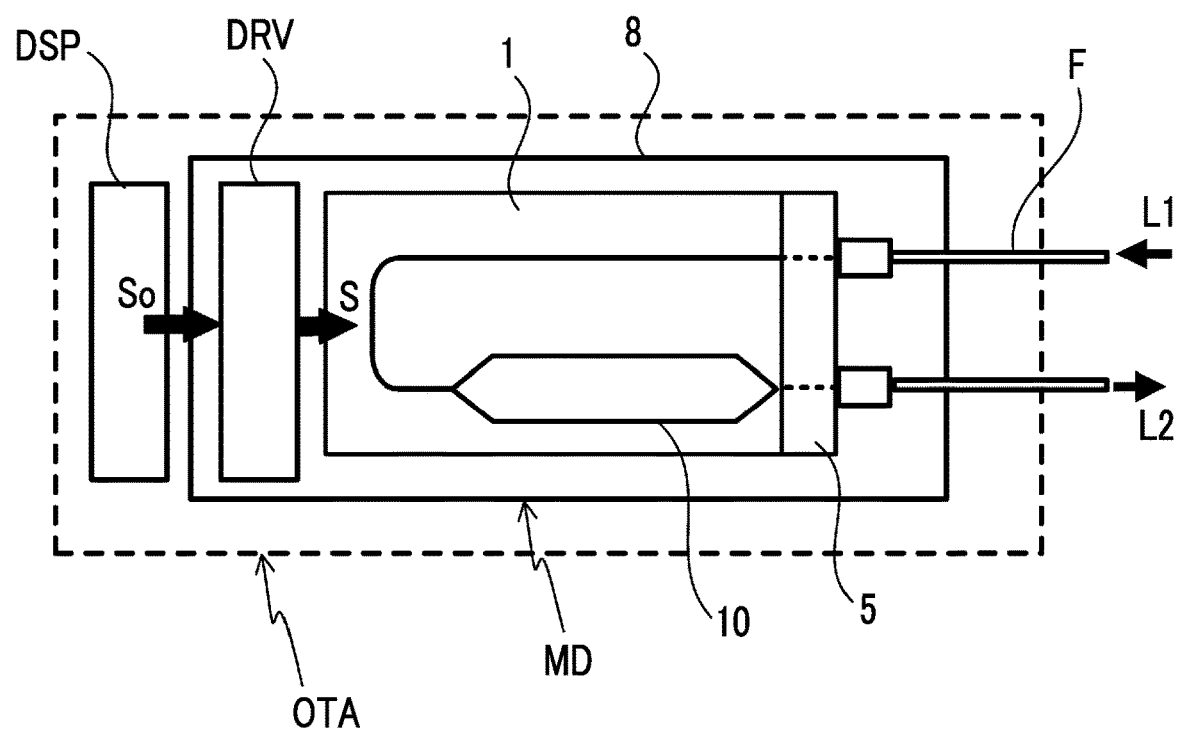
FIG. 15 is a plan view illustrating an optical modulation device and an optical transmission apparatus of the present invention.

The optical waveguide element of the present invention is provided with a modulation electrode that modulates the light wave propagating through the optical waveguide 10, and is accommodated in a case 8 as shown in FIG. 15. Further, an optical fiber F through which a light wave is input to and output from the optical waveguide is provided, so that an optical modulation device MD can be configured. In FIG. 15, the optical fiber is introduced into the case via a through-hole penetrating the side wall of the case and directly joined to the optical waveguide element. The optical waveguide element and the optical fiber can also be optically connected via a space optical system.

An optical transmission apparatus OTA can be configured by connecting an electronic circuit (digital signal processor DSP) that outputs a modulation signal for causing the optical modulation device MD to perform a modulation operation, to the optical modulation device MD. A driver circuit DRV is used because the modulation signal applied to the optical waveguide element needs to be amplified. The driver circuit DRV and the digital signal processor DSP can also be disposed outside the case 8, but can also be disposed inside the case 8. In particular, by disposing the driver circuit DRV inside the case, it is possible to further reduce the propagation loss of the modulation signal from the driver circuit.

INDUSTRIAL APPLICABILITY

As described above, according to the present invention, it is possible to provide an optical waveguide element that suppresses insertion loss related to coupling to an optical fiber or the like while miniaturizing the optical waveguide element. Further, it is also possible to provide an optical modulation device and an optical transmission apparatus using the optical waveguide element.

REFERENCE SIGNS LIST 1 layer made of material having electro-optic effect
2 reinforcing substrate
3 structure
4 coating layer
5 upper reinforcing substrate
10 optical waveguide
11, 15 tapered portion
MD optical modulation device
OTA optical transmission apparatus

The invention claimed is:
1. An optical waveguide element comprising:
a rib optical waveguide that is made of a material having an electro-optic effect; and
a reinforcing substrate that supports the optical waveguide,
wherein one end of the optical waveguide forms a tapered portion of which a width narrows toward an end surface of the reinforcing substrate,
a structure made of a material having a higher refractive index than a material constituting the reinforcing substrate is provided so as to cover the tapered portion,
a coating layer made of a material having a lower refractive index than the material constituting the structure is disposed so as to cover the structure,
the coating layer is made of an adhesive, and
the coating layer functions as an adhesive layer for joining an upper reinforcing substrate disposed on an upper side of the structure to the reinforcing substrate side on which the optical waveguide and the structure are formed.

2. The optical waveguide element according to claim 1, wherein the tapered portion includes optical waveguides having a shape of being stacked in multiple stages, and a width of the optical waveguide disposed on an upper side is narrower than a width of the optical waveguide disposed on a lower side.

3. The optical waveguide element according to claim 1, wherein a thickness of the reinforcing substrate near the end surface of the reinforcing substrate is thinner than a thickness of the reinforcing substrate on a lower side of the tapered portion.

4. The optical waveguide element according to claim 1, wherein a mode field diameter of a light wave propagating through the optical waveguide is lower than 3 μm, and a mode field diameter of an optical fiber that is connected to the optical waveguide element and through which a light wave is input to or output from the optical waveguide is 3 μm or higher.

5. An optical modulation device comprising:
the optical waveguide element according to any one of claims 1, 2, 3, and 4, the optical waveguide element being accommodated in a case and provided with an optical fiber through which a light wave is input to or output from the optical waveguide.

6. The optical modulation device according to claim 5, wherein the optical waveguide element includes a modulation electrode for modulating a light wave propagating through the optical waveguide, and an electronic circuit that amplifies a modulation signal input to the modulation electrode of the optical waveguide element is provided inside the case.

7. An optical transmission apparatus comprising:
the optical modulation device according to claim 5; and
an electronic circuit that outputs a modulation signal for causing the optical modulation device to perform a modulation operation.

* * * * *